US012638219B2

(12) United States Patent
Toyooka et al.

(10) Patent No.: US 12,638,219 B2
(45) Date of Patent: May 26, 2026

(54) REFRIGERATION APPARATUS WITH NON-AZEOTROPIC REFRIGERANT MIXTURE

(71) Applicant: PHC Corporation, Ehime (JP)

(72) Inventors: Takashi Toyooka, Saitama (JP); Hirofumi Yamanaka, Gunma (JP); Naoki Hashimoto, Gunma (JP); Yuuki Saitou, Gunma (JP)

(73) Assignee: PHC CORPORATION, Ehime (JP)

( * ) Notice: Subject to any disclaimer, the term of this patent is extended or adjusted under 35 U.S.C. 154(b) by 90 days.

(21) Appl. No.: 18/750,821

(22) Filed: Jun. 21, 2024

(65) Prior Publication Data

US 2024/0344742 A1 Oct. 17, 2024

Related U.S. Application Data

(63) Continuation of application No. PCT/JP2022/045375, filed on Dec. 8, 2022.

(30) Foreign Application Priority Data

Dec. 27, 2021 (JP) ................................. 2021-212650

(51) Int. Cl.
*F25B 9/00* (2006.01)
*C09K 5/04* (2006.01)

(52) U.S. Cl.
CPC .............. *F25B 9/006* (2013.01); *C09K 5/041* (2013.01); *C09K 2205/12* (2013.01); *C09K 2205/34* (2013.01)

(58) Field of Classification Search
CPC .......... F25B 2400/052; F25B 2400/054; F25B 40/00
See application file for complete search history.

(56) References Cited

U.S. PATENT DOCUMENTS 5,351,499 A * 10/1994 Takemasa .............. C09K 5/045
252/67
5,672,294 A * 9/1997 Lund ........................ C08J 9/149
521/131

(Continued)

FOREIGN PATENT DOCUMENTS

JP 2007-226699 A 9/2007
JP 2009-102567 A 5/2009
(Continued)

OTHER PUBLICATIONS

International Search Report dated Jan. 24, 2023 issued in International Patent Application No. PCT/JP2022/045375, with English translation.

*Primary Examiner* — Lionel Nouketcha
(74) *Attorney, Agent, or Firm* — Rimon P.C.

(57) ABSTRACT

A refrigeration apparatus has a refrigerant. The refrigerant is a non-azeotropic refrigerant mixture containing 50% by weight or more and 80% by weight or less of a high-boiling point refrigerant, 10% by weight or more and less than 50% by weight of a medium-boiling point refrigerant having a boiling point lower than that of the high-boiling point refrigerant, and 20% by weight or less of a low-boiling point refrigerant having a boiling point lower than that of the medium-boiling point refrigerant. The content of the high-boiling point refrigerant is larger than that of the medium-boiling point refrigerant, and the content of the medium-boiling point refrigerant is larger than that of the low-boiling point refrigerant. Piping through which the refrigerant derived from the compressor and flowing into the condenser passes includes a countercurrent flow configurator in which the refrigerant flowing through the piping is countercurrent to the cooling air.

12 Claims, 7 Drawing Sheets

(56)             References Cited

U.S. PATENT DOCUMENTS

| | | | | |
|---|---|---|---|---|
| 6,526,764 B1 * | 3/2003 | Singh | ..................... | C09K 5/045 |
| | | | | 62/84 |
| 6,951,115 B2 * | 10/2005 | Yuzawa | ................. | C09K 5/045 |
| | | | | 62/502 |
| 7,624,586 B2 * | 12/2009 | Yuzawa | ................. | C09K 5/045 |
| | | | | 252/68 |
| 9,039,923 B2 * | 5/2015 | Mahmoud | .............. | C09K 5/045 |
| | | | | 252/68 |
| 2006/0123805 A1 * | 6/2006 | Yuzawa | ................... | F25B 7/00 |
| | | | | 62/335 |
| 2011/0126575 A1 * | 6/2011 | Kobayashi | .............. | F25B 41/37 |
| | | | | 62/333 |
| 2013/0327078 A1 * | 12/2013 | Junge | ................... | F25D 11/022 |
| | | | | 62/335 |

FOREIGN PATENT DOCUMENTS

| | | | |
|---|---|---|---|
| JP | 2010-043752 A | 2/2010 |
| JP | 2013-200075 A | 10/2013 |
| JP | 2016-070571 A | 5/2016 |
| JP | 2019-135439 A | 8/2019 |
| KR | 10-2017-0085707 A | 7/2017 |
| WO | 2011/150940 A1 | 12/2011 |

* cited by examiner

| | NAME OF REFRIGERANT | BOILING POINT | CRITICAL TEMPERATURE |
|---|---|---|---|
| GROUP OF HIGH-BOILING POINT REFRIGERANTS | NORMAL BUTANE | -0.55°C | 151.98°C |
| | ISOBUTANE | -11.7°C | 134.67°C |
| GROUP OF MEDIUM-BOILING POINT REFRIGERANTS | ETHANE | -88.6°C | 32.18°C |
| | ETHYLENE | -103.68°C | 9.4°C |
| | XENON | -108.1°C | 16.58°C |
| GROUP OF LOW-BOILING POINT REFRIGERANTS | METHANE | -161.49°C | -82.59°C |
| | KRYPTON | -153.35°C | -63.75°C |

REFRIGERATION APPARATUS WITH NON-AZEOTROPIC REFRIGERANT MIXTURE

CROSS-REFERENCE OF RELATED APPLICATIONS

This application is a Continuation of International Patent Application No. PCT/JP2022/045375, filed on Dec. 8, 2022, which in turn claims the benefit of Japanese Patent Application No. 2021-212650, filed on Dec. 27, 2021, the entire disclosure of which Applications are incorporated by reference herein.

TECHNICAL FIELD

The present invention relates to a refrigeration apparatus.

BACKGROUND ART

Patent Literature (hereinafter referred to as "PTL") 1 discloses a refrigeration circuit through which a non-azeotropic refrigerant mixture containing no fluorocarbon-based refrigerant circulates and which causes the temperature of an object to be equal to or lower than −60° C.

CITATION LIST

Patent Literature

PTL 1
  Japanese Patent Application Laid-Open No. 2009-102567

SUMMARY OF INVENTION

Technical Problem

The respective types and ratios of refrigerants in a refrigerant mixture as well as the ambient temperature of a refrigeration circuit affect the refrigeration capacity of the refrigeration circuit. Specifically, in a case where the respective types and ratios of refrigerants to be mixed are inappropriate and the refrigerant mixture does not sufficiently liquefy in the condensation, the amount of the refrigerant mixture to be evaporated in an evaporator becomes small and the refrigeration capacity of the refrigeration circuit decreases. Further, in a case where the ambient temperature becomes high and the refrigerant mixture does not sufficiently liquefy in the condensation, the refrigeration capacity of the refrigeration circuit decreases.

An object of the present disclosure is to solve the above-described problems in the related art, thereby stabilizing the refrigeration capacity of a refrigeration apparatus.

Solution to Problem

To achieve the object described above, a refrigeration apparatus in the present disclosure is a refrigeration apparatus including a refrigeration circuit and a fan. The refrigeration circuit includes: a compressor; a condenser; an expander; an evaporator; and a heat exchanger that cools a refrigerant flowing through the expander by means of the refrigerant flowing from the evaporator to the compressor, and the refrigerant circulates through the refrigeration circuit. The fan generates cooling air that cools the condenser. The refrigerant is a non-azeotropic refrigerant mixture that contains 50% by weight or more and 80% by weight or less of a high-boiling point refrigerant, 10% by weight or more and less than 50% by weight of a medium-boiling point refrigerant, and 20% by weight or less of a low-boiling point refrigerant, where the medium-boiling point refrigerant has a boiling point lower than the boiling point of the high-boiling point refrigerant, and the low-boiling point refrigerant has a boiling point lower than the boiling point of the medium-boiling point refrigerant. The content of the high-boiling point refrigerant in the refrigerant is larger than the content of the medium-boiling point refrigerant in the refrigerant, and the content of the medium-boiling point refrigerant in the refrigerant is larger than the content of the low-boiling point refrigerant in the refrigerant. Piping through which the refrigerant derived from the compressor and flowing into the condenser passes includes a counter-current flow configurator in which the refrigerant flowing through the piping is countercurrent to the cooling air.

Advantageous Effects of Invention

A refrigeration apparatus according to one aspect of the present disclosure is capable of stabilizing refrigeration capacity.

DESCRIPTION OF EMBODIMENTS

Hereinafter, a refrigeration apparatus in an embodiment of the present disclosure will be described with reference to the accompanying drawings. Note that, hereinafter, as indicated with the arrows in FIG. 1, the side of the refrigeration apparatus, which the user faces when using the refrigeration apparatus, will be referred to as the front of the refrigeration apparatus, and the side opposite to the front will be referred to as the rear of the refrigeration apparatus. Further, the left and right sides of the refrigeration apparatus when viewed from the front will be referred to as the left and right of the refrigeration apparatus, respectively. Further, the side of the refrigeration apparatus, which is away from the surface on which the refrigeration apparatus is installed, will be referred to as the up of the refrigeration apparatus, and the side opposite to the up will be referred to as the down of the refrigeration apparatus.

Figure 1:
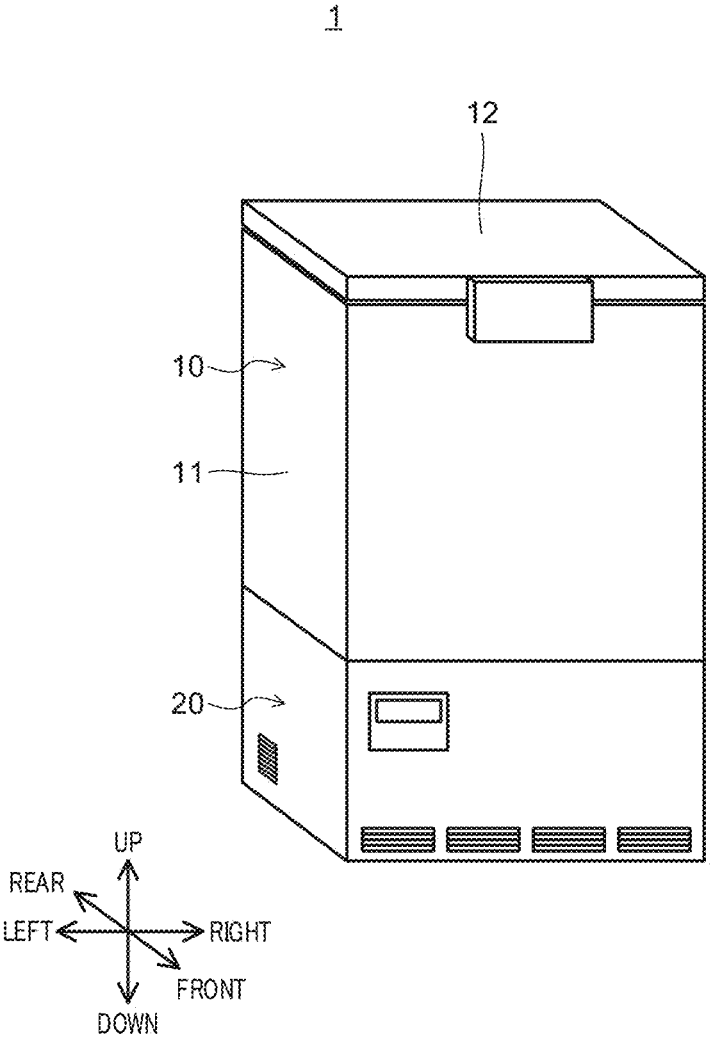
FIG. 1 is a perspective view of a refrigeration apparatus in an embodiment of the present disclosure.

FIG. 1 is a perspective view of an example of the refrigeration apparatus. Refrigeration apparatus 1 is an ultra-low temperature storage container capable of storing a sample such as a biological tissue at an ultra-low temperature equal to or lower than −80° C. Note that, refrigeration apparatus 1 may be an ultra-low temperature freezer, a pharmaceutical refrigerator, a blood bank refrigerator, or a thermostat. Refrigeration apparatus 1 includes main body 10, machine processor 20, and refrigeration circuit 30 to be described later.

Main body 10 includes: housing 11 including therein a storage chamber including an opening that opens upward; and door 12 that opens and closes the opening. The storage chamber is a space in which a sample is stored, and is cooled to an ultra-low temperature.

Machine processor 20 houses compressor 31 to be described later or the like.

Figures 2, 3:
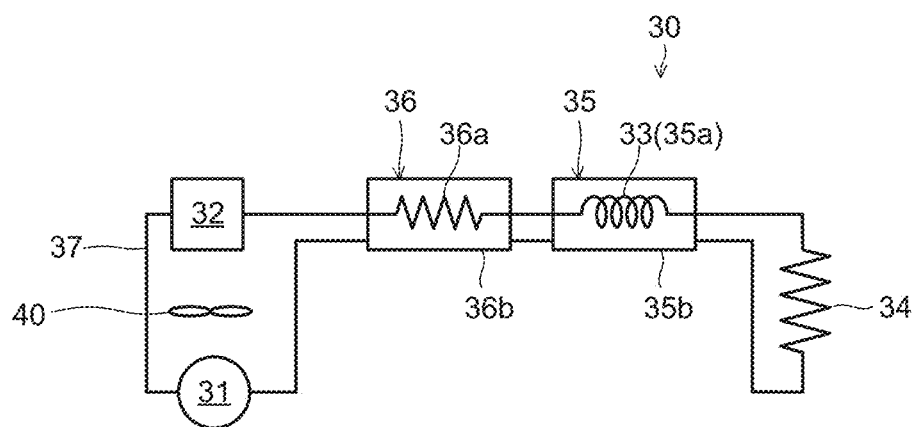
FIG. 2 is a schematic diagram of a refrigeration circuit.
FIG. 3 illustrates a group of high-boiling point refrigerants, a group of medium-boiling point refrigerants, and a group of low-boiling point refrigerants.

FIG. 2 is a schematic diagram of refrigeration circuit 30. Refrigeration circuit 30 cools the storage chamber. Refrigeration circuit 30 includes compressor 31, condenser 32, expander 33, evaporator 34, heat exchanger 35, second heat exchanger 36, and piping 37 through which a refrigerant flows.

Compressor 31 compresses the refrigerant such that the pressure value of the refrigerant is equal to or higher than 1 MPa. Thus, the refrigerant circulates through refrigeration circuit 30 appropriately.

Condenser 32 is, for example, a wire-tube type condenser. Thus, it is possible to cool the refrigerant efficiently. Note that, condenser 32 may be, albeit not limited to, a pipe-on-sheet type condenser, a cross-fin type condenser, or a micro-channel condenser.

Heat exchanger 35 is a double-tube type heat exchanger. Heat exchanger 35 is disposed between condenser 32 and evaporator 34. Inner pipe 35a of heat exchanger 35 is expander 33. Expander 33 is, for example, a capillary tube. The refrigerant flows through expander 33 from compressor 31 to evaporator 34. The refrigerant flows through outer pipe 35b of heat exchanger 35 from evaporator 34 to compressor 31. Hereinafter, the refrigerant flowing from evaporator 34 to compressor 31 will be referred to as the return refrigerant.

Second heat exchanger 36 is a double-tube type heat exchanger. Second heat exchanger 36 is disposed between condenser 32 and heat exchanger 35. The refrigerant flows through inner pipe 36a of second heat exchanger 36 from compressor 31 to evaporator 34. The return refrigerant flows through outer pipe 36b of second heat exchanger 36. Note that, second heat exchanger 36 may be covered with an insulating material (for example, a foam).

The refrigerant is a non-azeotropic refrigerant mixture in which a high-boiling point refrigerant, a medium-boiling point refrigerant having a boiling point lower than a boiling point of the high-boiling point refrigerant, and a low-boiling point refrigerant having a boiling point lower than the boiling point of the medium-boiling point refrigerant are mixed.

FIG. 3 illustrates a group of high-boiling point refrigerants, a group of medium-boiling point refrigerants, and a group of low-boiling point refrigerants. The high-boiling point refrigerant is selected from the group of high-boiling point refrigerants. The group of high-boiling point refrigerants includes normal butane (boiling point: −0.55° C., refrigerant number: R600) and isobutane (boiling point: −11.7° C., refrigerant number: R600a), which are hydrocarbon gases. Note that, the refrigerant numbers are numbers based on Standard 34 of the American Society of Heating, Refrigerating and Air-Conditioning Engineers (ASHRAE).

The medium-boiling point refrigerant is selected from the group of medium-boiling point refrigerants. The group of medium-boiling point refrigerants includes ethane (boiling point: −88.6° C., refrigerant number: R170), ethylene (boiling point: −103.68° C., refrigerant number: R1150), which are hydrocarbon gases, and xenon (boiling point: −108.1° C.), which is a rare gas.

The low-boiling point refrigerant is selected from the group of low-boiling point refrigerants. The group of low-boiling point refrigerants includes methane (boiling point: −161.49° C., refrigerant number: R50), which is a hydrocarbon gas, and krypton (boiling point: −153.35° C.), which is a rare gas.

The total weight of the refrigerant is defined as equal to or less than 150 g. Thus, it is possible to conform to the IEC (International Electrotechnical Commission) standards. Further, the hydrocarbon gases and the rare gases that form the refrigerant in the present embodiment are capable of suppressing the environmental impact.

Further, the ratio of the high-boiling point refrigerant to the entire refrigerant is defined as 50% by weight or more and 80% by weight or less. The ratio of the medium-boiling point refrigerant to the entire refrigerant is defined as 10% by weight or more and less than 50% by weight. The ratio of the low-boiling point refrigerant to the entire refrigerant is defined as 20% by weight or less. In addition, the combined refrigerant ratio of the medium-boiling point refrigerant and the low-boiling point refrigerant to the entire refrigerant is defined as 50% by weight or less. Further, the content of the high-boiling point refrigerant in the refrigerant is defined as larger than the content of the medium-boiling point refrigerant in the refrigerant, and the content of the medium-boiling point refrigerant in the refrigerant is defined as larger than the content of the low-boiling point refrigerant in the refrigerant.

Further, the high-boiling point refrigerant, the medium-boiling point refrigerant, and the low-boiling point refrigerant are selected and the respective ratios of the high-boiling point refrigerant, the medium-boiling point refrigerant, and the low-boiling point refrigerant to the entire refrigerant are defined such that the temperature of the refrigerant when the refrigerant flowing from evaporator 34 to compressor 31 flows into outer pipe 35b of heat exchanger 35 in refrigeration circuit 30 is equal to or lower than the critical temperature of the low-boiling point refrigerant. Thus, as will be described later, it is possible to promote the liquefaction of the refrigerant flowing through expander 33.

In addition, the respective types of the high-boiling point refrigerant, the medium-boiling point refrigerant, and the low-boiling point refrigerant and the respective ratios of the high-boiling point refrigerant, the medium-boiling point refrigerant, and the low-boiling point refrigerant to the entire refrigerant are defined such that the pressure value of the refrigerant compressed by compressor 31 in refrigeration circuit 30 is equal to or lower than 2 MPa. Thus, as will be described later, it is possible to sufficiently liquefy the refrigerant and to achieve reduction in the temperature of the refrigerant.

In the refrigerant in the present embodiment, the high-boiling point refrigerant is defined as normal butane, the medium-boiling point refrigerant is defined as ethane, and the low-boiling point refrigerant is defined as methane. In addition, in the refrigerant in the present embodiment, the content of the high-boiling point refrigerant is defined as 50% by weight, the content of the medium-boiling point refrigerant is defined as 30% by weight, and the content of the low-boiling point refrigerant is defined as 20% by weight. Note that, the refrigerant contains pentane as an oil carrier.

In addition, refrigeration apparatus 1 further includes fan 40.

Figure 4:
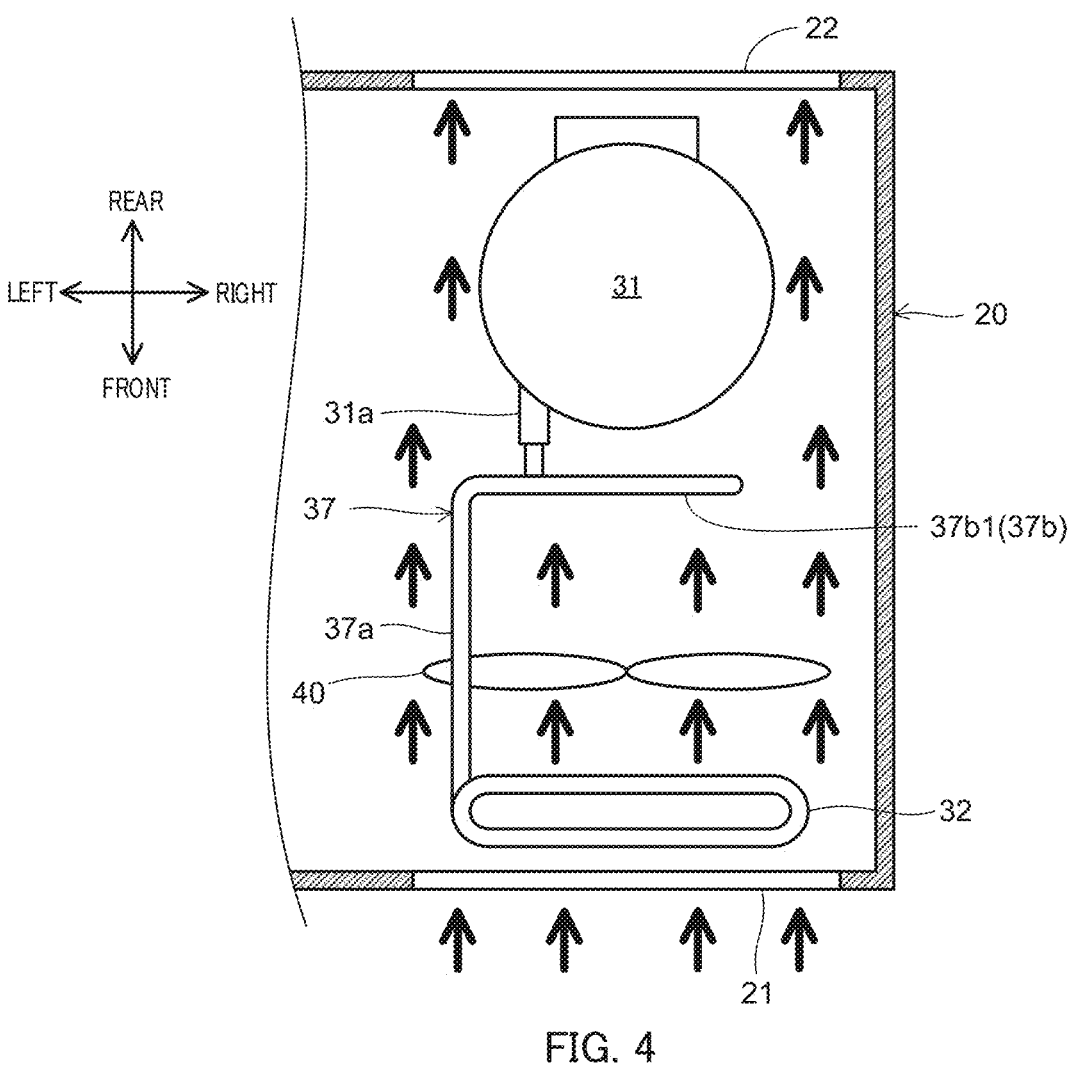
FIG. 4 is a plan view of a compressor, a fan, a condenser, and piping.

FIG. 4 is a plan view of the interior of machine processor 20. Machine processor 20 includes front opening 21 at the front wall and rear opening 22 at the rear wall. Front opening 21 and rear opening 22 face each other in the front-rear direction. Note that, it is a matter of course that the positions of front opening 21 and rear opening 22 are not limited to the positions illustrated in FIG. 4. Machine processor 20 houses compressor 31, fan 40, condenser 32, and piping 37 that connects compressor 31 to condenser 32.

Fan 40 generates cooling air that cools condenser 32. Fan 40 is disposed between front opening 21 and rear opening 22 in the front-rear direction. When fan 40 rotates, the outside air around machine processor 20 is sucked into machine processor 20 through front opening 21, and the air in machine processor 20 is discharged from rear opening 22. That is, the cooling air generated by fan 40 flows from the front to the rear along the front-rear direction inside machine processor 20. The thick arrows in solid line in FIG. 4 indicate the flow of the cooling air. Note that, the outside air around machine processor 20 is the air in the room in which refrigeration apparatus 1 is installed. The outside air temperature is approximately 0 to 30° C.

Condenser 32, fan 40, and compressor 31 are arranged in this order so as to be side by side along the direction in which the cooling air flows (that is, the front-rear direction). Condenser 32 is disposed between front opening 21 and fan 40. That is, condenser 32 is cooled by the outside air sucked through front opening 21.

Compressor 31 is disposed between fan 40 and rear opening 22. Further, compressor 31 is disposed such that deriver 31a for deriving the refrigerant to piping 37 faces fan 40. Further, compressor 31 is disposed such that the direction in which the refrigerant flows through deriver 31a is directed from the rear to the front along the front-rear direction. That is, the flow of the refrigerant in deriver 31a is countercurrent to the cooling air. Accordingly, the refrigerant flowing through deriver 31a is efficiently cooled by the cooling air. Note that, compressor 31 may be disposed such that the flow of the refrigerant in deriver 31a is not countercurrent to the cooling air.

Piping 37 is a portion through which the refrigerant derived from compressor 31 and flowing into condenser 32 passes, and includes countercurrent flow configurator 37a in which the refrigerant flowing through piping 37 is countercurrent to the cooling air. Countercurrent flow configurator 37a is disposed, between compressor 31 and condenser 32, so as to extend along the direction in which the cooling air flows (that is, the front-rear direction). In countercurrent flow configurator 37a, the refrigerant flows from the rear to the front along the front-rear direction. That is, the flow of the refrigerant in countercurrent flow configurator 37a is countercurrent to the cooling air. Accordingly, the refrigerant flowing through countercurrent flow configurator 37a is efficiently cooled by the cooling air.

Further, piping 37 is a portion through which the refrigerant derived from compressor 31 and flowing into condenser 32 passes, and includes cross flow configurator 37b in which the refrigerant flowing through piping 37 flows so as to intersect with the cooling air.

Figure 5:
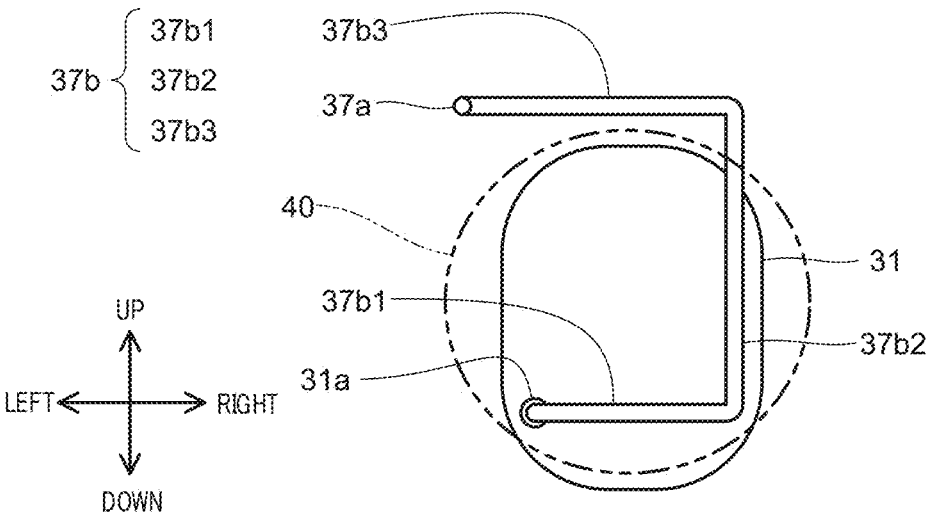
FIG. 5 is a side view of the compressor and the piping as viewed from the fan.

FIG. 5 is a side view of compressor 31 and piping 37 as viewed from fan 40. The two-dot chain line in FIG. 5 indicates the outline of fan 40. Cross flow configurator 37b includes first portion 37b1 in which the refrigerant flows from the left to the right along the left-right direction between fan 40 and compressor 31, second portion 37b2 in which the refrigerant flows from the down to the up along the up-down direction between fan 40 and compressor 31, and third portion 37b3 in which the refrigerant flows from the right to the left along the left-right direction between fan 40 and compressor 31. That is, in first portion 37b1 to third portion 37b3, the refrigerant flows so as to be orthogonal to the cooling air. Thus, the refrigerant flowing through first portion 37b1 to third portion 37b3, that is, cross flow configurator 37b is cooled by the cooling air. The refrigerant that has flowed out from deriver 31a flows through first portion 37b1, second portion 37b2, third portion 37b3, and countercurrent flow configurator 37a in this order, and flows into condenser 32.

Next, operations of refrigeration apparatus 1 will be described along the flow of the refrigerant.

In compressor 31, the refrigerant is compressed such that the pressure value of the refrigerant is equal to or higher than 1 MPa and equal to or lower than 2 MPa as described above. The higher the pressure of the refrigerant compressed by compressor 31, the higher the temperature of the refrigerant when compressed by compressor 31. Accordingly, the temperature of the refrigerant when the pressure value of the refrigerant is equal to or higher than 1 MPa and equal to or lower than 2 MPa is lower than the temperature of the refrigerant when the pressure value of the refrigerant is higher than 2 MPa.

The refrigerant is cooled by the cooling air when the refrigerant passes through deriver 31a. The refrigerant derived from deriver 31a of compressor 31 is cooled by the cooling air when the refrigerant flows through cross flow configurator 37b and countercurrent flow configurator 37a, and flows into condenser 32. In condenser 32, the refrigerant is cooled by the cooling air.

The refrigerant is efficiently cooled in deriver 31a, cross flow configurator 37b, countercurrent flow configurator 37a, and condenser 32. Further, as described above, the temperature of the refrigerant in a case where the pressure value of the refrigerant is equal to or lower than 2 MPa is lower than the temperature of the refrigerant in a case where the pressure value of the refrigerant is higher than 2 MPa. Thus, the temperature of the refrigerant decreases to the temperature of the cooling air, that is, the outside air temperature and at least a part of the high-boiling point refrigerant liquefies until the refrigerant that has flowed out from condenser 32 flows into inner pipe 36a of second heat exchanger 36.

In inner pipe 36a of second heat exchanger 36, the refrigerant is cooled by the return refrigerant flowing through outer pipe 36b of second heat exchanger 36. In inner pipe 36a of second heat exchanger 36, at least a part of the high-boiling point refrigerant and a part of the medium-boiling point refrigerant liquefy. The refrigerant that flowed out from second heat exchanger 36 flows into inner pipe 35a of heat exchanger 35, that is, expander 33.

In expander 33, the pressure and temperature of the refrigerant decrease. Further, in expander 33, the refrigerant is cooled by the return refrigerant flowing through outer pipe 35b of heat exchanger 35. As described above, the temperature of the return refrigerant when the return refrigerant flows into outer pipe 35b of heat exchanger 35 is equal to or lower than the critical temperature of the low-boiling point refrigerant, and the cooling of the refrigerant flowing through expander 33 is promoted. Thus, almost all of the refrigerant flowing through expander 33 liquefies. Accordingly, it is possible to ensure the amount of the refrigerant to be vaporized in evaporator 34 in order to cause the temperature of the storage chamber to be an ultra-low temperature equal to or lower than −80° C. The refrigerant that has flowed out from expander 33 flows into evaporator 34.

In evaporator 34, the heat of the air in the storage chamber is absorbed by the refrigerant, and thus, the air in the storage chamber is cooled and the refrigerant vaporizes. The refrigerant that has flowed out from evaporator 34 returns to outer pipe 35*b* of heat exchanger 35 and flows thereto as the return refrigerant.

The return refrigerant flowing through outer pipe 35*b* of heat exchanger 35 absorbs heat from the refrigerant flowing through expander 33. In outer pipe 35*b* of heat exchanger 35, the return refrigerant which has not vaporized in evaporator 34 vaporizes. Thus, almost all of the return refrigerant vaporizes. The refrigerant that has flowed out from outer pipe 35*b* of heat exchanger 35 flows into outer pipe 36*b* of second heat exchanger 36.

The return refrigerant flowing through outer pipe 36*b* of second heat exchanger 36 absorbs heat from the refrigerant flowing through inner pipe 36*a* of second heat exchanger 36. The return refrigerant that has flowed out from outer pipe 36*b* of second heat exchanger 36 flows into compressor 31.

Figure 6:
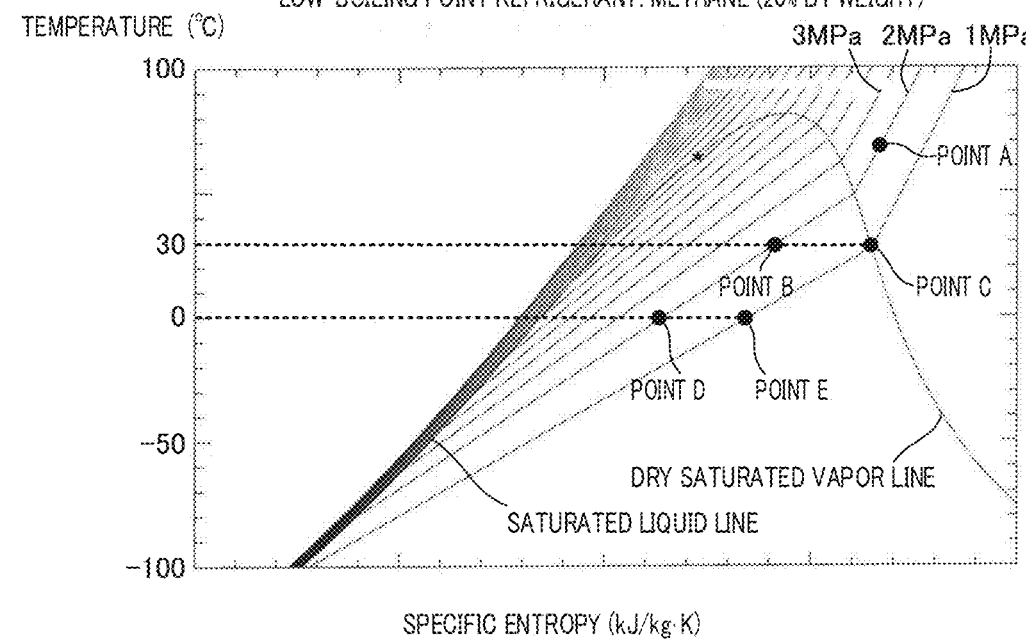
FIG. 6 is a T-s diagram for a refrigerant.

FIG. 6 is a T-s diagram for the refrigerant in the present embodiment. In the T-s diagram, the vertical axis represents the temperature (° C.) of the refrigerant, and the horizontal axis represents the specific entropy of the refrigerant (kJ/kg·K). The high-boiling point refrigerant, the medium-boiling point refrigerant, and the low-boiling point refrigerant are selected in the above-described manner and the refrigerants are mixed at the foregoing respective ratios to the entire refrigerant. Thus, the saturated liquid line and the dry saturated vapor line in the T-s diagram for the refrigerant in the present embodiment have the shapes illustrated in FIG. 6.

Hereinafter, in a case where the outside air temperature fluctuates within the outside air temperature range (0 to 30° C.) and the pressure of the refrigerant fluctuates within the refrigerant pressure range (1 to 2 MPa), the state of the refrigerant between when the refrigerant is compressed by compressor 31 and when the refrigerant flows into second heat exchanger 36 will be described with reference to FIG. 6. First, a case where the outside air temperature is 30° C. and the pressure value of the refrigerant is 2 MPa will be described.

When the refrigerant is compressed by compressor 31, and thus, the pressure value of the refrigerant becomes 2 MPa, the refrigerant becomes the state at point A rightward from the dry saturated vapor line and on the contour line of 2 MPa in FIG. 6. That is, the refrigerant when compressed by compressor 31 is in a gas state.

Then, when the refrigerant is cooled by the cooling air in deriver 31*a*, cross flow configurator 37*b*, countercurrent flow configurator 37*a*, and condenser 32, the state of the refrigerant moves in a direction, in which the temperature decreases, along the contour line of 2 MPa from the state at point A.

In a case where the pressure value of the refrigerant is 2 MPa, the temperature of the refrigerant when the refrigerant flows into inner pipe 36*a* of second heat exchanger 36 decreases to the temperature of the cooling air (that is, the outside air temperature (30° C.)) as described above. Accordingly, the refrigerant when the refrigerant flows into inner pipe 36*a* of second heat exchanger 36 becomes the state at point B corresponding to 30° C. on the contour line of 2 MPa. Point B is located between the saturated liquid line and the dry saturated vapor line. That is, in a case where the outside air temperature is 30° C. and the pressure value of the refrigerant is 2 MPa, the refrigerant when the refrigerant flows into inner pipe 36*a* of second heat exchanger 36 is in a state in which at least a part of the high-boiling point refrigerant is liquefied.

Further, in a case where the outside air temperature is 30° C. and the pressure value of the refrigerant is 1 MPa, the temperature of the refrigerant when the refrigerant flows into inner pipe 36*a* of second heat exchanger 36 is approximately the outside air temperature (30° C.), and the refrigerant at this time becomes the state at point C on the contour line of 1 MPa. Point C is located approximately on the dry saturated vapor line. That is, in a case where the outside air temperature is 30° C. and the pressure value of the refrigerant is 1 to 2 MPa, the refrigerant when the refrigerant flows into inner pipe 36*a* of second heat exchanger 36 is in a state in which at least a part of the high-boiling point refrigerant is liquefied.

Further, in a case where the outside air temperature is 0° C. and the pressure value of the refrigerant is 2 MPa, the temperature of the refrigerant when the refrigerant flows into inner pipe 36*a* of second heat exchanger 36 is approximately the outside air temperature (0° C.), and the refrigerant at this time becomes the state at point D on the contour line of 2 MPa.

Further, in a case where the outside air temperature is 0° C. and the pressure value of the refrigerant is 1 MPa, the temperature of the refrigerant when the refrigerant flows into inner pipe 36*a* of second heat exchanger 36 is approximately the outside air temperature (0° C.), and the refrigerant at this time becomes the state at point E on the contour line of 1 MPa.

In the same manner as with point B, points D and E are located between the saturated liquid line and the dry saturated vapor line. That is, in a case where the outside air temperature is 0° C. and the pressure value of the refrigerant is 1 to 2 MPa, the refrigerant when the refrigerant flows into inner pipe 36*a* of second heat exchanger 36 is in a state in which at least apart of the high-boiling point refrigerant is liquefied. Accordingly, in a case where the outside air temperature is 0 to 30° C. and the pressure value is 1 to 2 MPa, the refrigerant when the refrigerant flows into inner pipe 36*a* of second heat exchanger 36 is in a state in which at least a part of the high-boiling point refrigerant is liquefied.

The pressure value of the refrigerant compressed by compressor 31 is 1 to 2 MPa as described above, the high-boiling point refrigerant, the medium-boiling point refrigerant, and the low-boiling point refrigerant are selected in the above-described manner, the refrigerants are mixed at the foregoing respective ratios to the entire refrigerant, and the refrigerant is cooled in deriver 31*a*, cross flow configurator 37*b*, and countercurrent flow configurator 37*a*, and thus, the refrigerant when the refrigerant flows into inner pipe 36*a* of second heat exchanger 36 is in a state in which at least a part of the high-boiling point refrigerant is liquefied, even when the outside air temperature fluctuates in the range from 0 to 30° C. Then, the refrigerant is cooled in heat exchangers 35 and 36, and thus, almost all of the refrigerant liquefies. Accordingly, it is possible to sufficiently liquefy the refrigerant, and further it is possible to achieve stabilization of the amount of the refrigerant to be vaporized in evaporator 34. Thus, it is possible to achieve stabilization of the refrigeration capacity of refrigeration apparatus 1.

In a case where the pressure value of the refrigerant compressed by compressor 31 is higher than 2 MPa, on the other hand, the temperature of the compressed refrigerant becomes higher than that in a case where the pressure value of the refrigerant is equal to or lower than 2 MPa. In this case, even when the refrigerant is cooled in deriver 31*a*, cross flow configurator 37*b*, countercurrent flow configurator 37*a*, and condenser 32, the temperature of the refrigerant when the refrigerant flows into inner pipe 36*a* of second heat exchanger 36 does not decrease to the temperature of the cooling air (that is, the outside air temperature). That is, when the pressure value of the refrigerant compressed by compressor 31 is equal to or lower than 2 MPa, it is possible to reduce the temperature of the refrigerant in comparison with a case where the pressure value of the refrigerant is higher than 2 MPa. Thus, it is possible to achieve reduction in the temperature of the refrigerant in evaporator 34, and further to achieve reduction in the temperature in the storage chamber.

Figure 7:
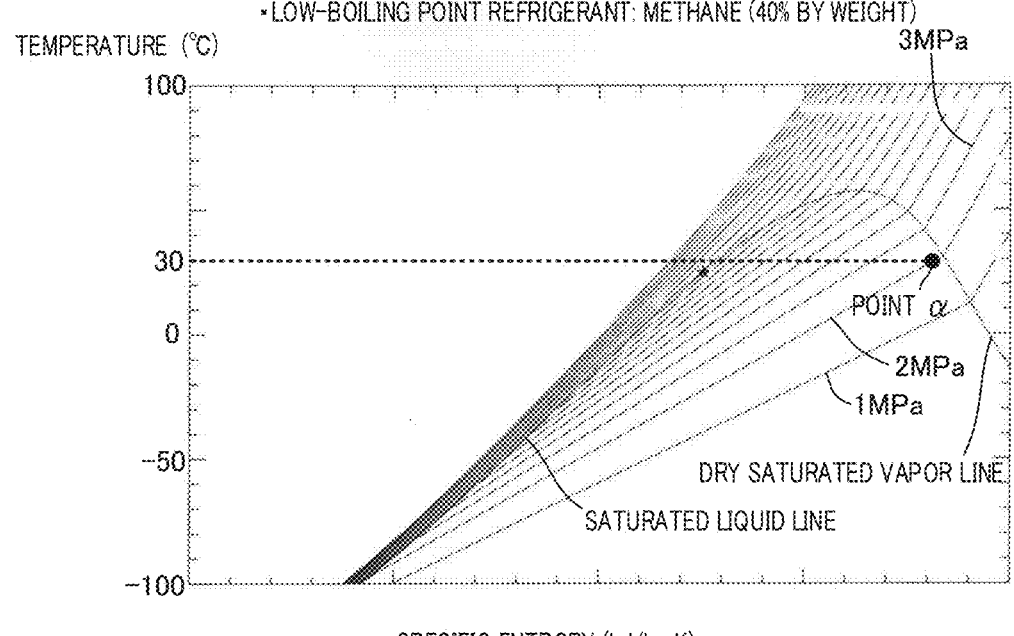
FIG. 7 is a T-s diagram for the refrigerant in a comparative example.

FIG. 7 is a T-s diagram for the refrigerant in a comparative example. The refrigerant in the comparative example and the refrigerant in the present embodiment are the same in terms of the respective types of the high-boiling point refrigerant, the medium-boiling point refrigerant, and the low-boiling point refrigerant. The respective ratios of the high-boiling point refrigerant, the medium-boiling point refrigerant, and the low-boiling point refrigerant to the entire refrigerant in the refrigerant in the comparative example, on the other hand, deviate from the ranges of the respective ratios of the high-boiling point refrigerant, the medium-boiling point refrigerant, and the low-boiling point refrigerant to the entire refrigerant in the refrigerant in the present embodiment. Specifically, in the refrigerant in the comparative example, the content of the high-boiling point refrigerant (normal butane) is defined as 40% by weight, the content of the medium-boiling point refrigerant (ethane) is defined as 20% by weight, and the content of the low-boiling point refrigerant (methane) is defined as 40% by weight.

In a case where the outside air temperature is 30° C. and the pressure value of the refrigerant is 2 MPa, the temperature of the refrigerant in the comparative example when the refrigerant in the comparative example flows into inner pipe 36*a* of second heat exchanger 36 is approximately the outside air temperature (30° C.), and the refrigerant in the comparative example at this time becomes the state at point α on the contour line of 2 MPa. Point α is located between the saturated liquid line refrigerant and the dry saturated vapor line. That is, in a case where the outside air temperature is 30° C. and the pressure value of the refrigerant is 2 MPa, the refrigerant in the comparative example when the refrigerant in the comparative example flows into inner pipe 36*a* of second heat exchanger 36 is in a state in which at least a part of the high-boiling point refrigerant is liquefied.

Point α, however, is located in the vicinity of the dry saturated vapor line. Accordingly, in a case where the outside air temperature is 30° C. and the pressure of refrigerant slightly decreases from 2 MPa, the state of the refrigerant in the comparative example is located rightward from the dry saturated vapor line. That is, in this case, the refrigerant in the comparative example when the refrigerant in the comparative example flows into inner pipe 36*a* of second heat exchanger 36 is in a gas state and is not liquefied. As described above, with respect to the respective ratios of the high-boiling point refrigerant, the medium-boiling point refrigerant, and the low-boiling point refrigerant to the entire refrigerant in the refrigerant in the comparative example, the refrigerant when the refrigerant flows into inner pipe 36*a* of second heat exchanger 36 may not be liquefied due to a fluctuation in the pressure of the refrigerant. That is, there is a case where the refrigerant in the comparative example cannot be sufficiently liquefied even when the refrigerant is cooled in heat exchangers 35 and 36.

The present disclosure is not limited to the embodiment described so far. Various variations to the present embodiment are also included in the scope of the present disclosure without departing from the purport of the present disclosure.

For example, in the refrigerant in the embodiment described above, the high-boiling point refrigerant may be isobutane. That is, the high-boiling point refrigerant may be defined as isobutane, the medium-boiling point refrigerant may be defined as ethane, and the low-boiling point refrigerant may be defined as methane. In this case, the content of the high-boiling point refrigerant may be defined as 50% by weight, the content of the medium-boiling point refrigerant may be defined as 30% by weight, and the content of the low-boiling point refrigerant may be defined as 20% by weight.

Figure 8:
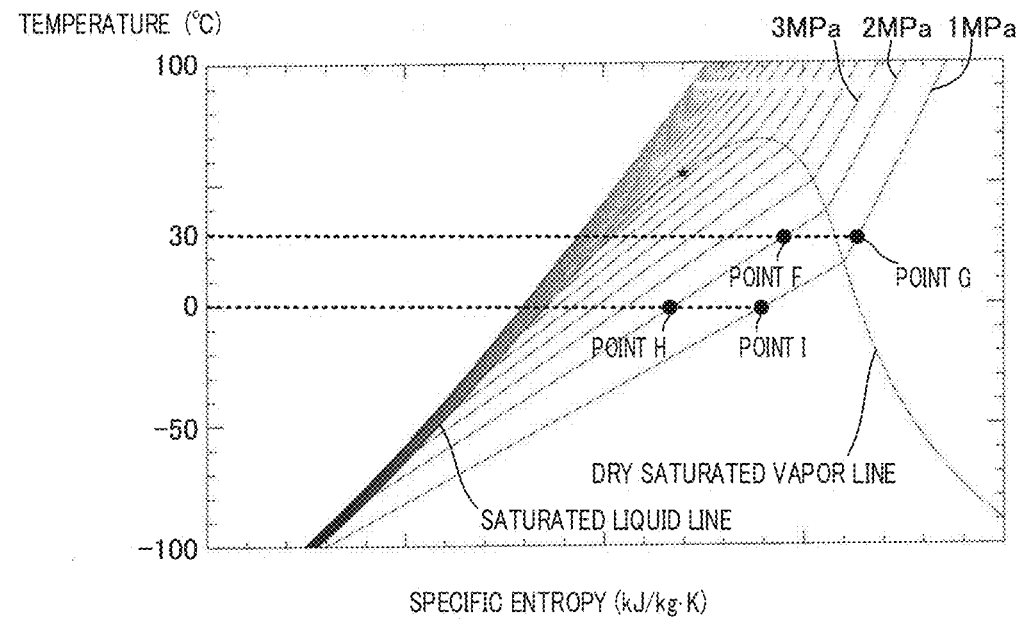
FIG. 8 is T-s diagram for the refrigerant according to a variation of the present disclosure.

FIG. 8 is T-s diagram for the refrigerant in a case where the high-boiling point refrigerant is isobutane. In a case where the outside air temperature is 30° C. and the pressure value of the refrigerant is 2 MPa, the temperature of the refrigerant when the refrigerant flows into inner pipe 36*a* of second heat exchanger 36 is approximately the outside air temperature (30° C.), and the refrigerant at this time becomes the state at point F on the contour line of 2 MPa. Point F is located between the saturated liquid line and the dry saturated vapor line. That is, in a case where the high-boiling point refrigerant is isobutane, the outside air temperature is 30° C., and the pressure value of the refrigerant is 2 MPa, the refrigerant when the refrigerant flows into inner pipe 36*a* of second heat exchanger 36 is in a state in which at least a part of the high-boiling point refrigerant is liquefied.

Note that, in a case where the outside air temperature is 30° C. and the pressure value of the refrigerant is 1 MPa, the temperature of the refrigerant when the refrigerant flows into inner pipe 36*a* of second heat exchanger 36 is approximately the outside air temperature (30° C.), and the refrigerant at this time becomes the state at point G on the contour line of 1 MPa. Point G is located rightward from the dry saturated vapor line. Accordingly, the refrigerant when the refrigerant flows into inner pipe 36*a* of second heat exchanger 36 is in a gas state and is not liquefied. That is, in a case where the high-boiling point refrigerant is isobutane, it is desirable that the pressure value of the refrigerant be brought close to 2 MPa, and thus, the refrigerant when the refrigerant flows into inner pipe 36*a* of second heat exchanger 36 be liquefied. Note that, in a case where the outside air temperature is 0° C. and the pressure value of the refrigerant is 1 to 2 MPa, the temperature of the refrigerant when the refrigerant flows into inner pipe 36*a* of second heat exchanger 36 is approximately the outside air temperature (0° C.), and the refrigerant at this time becomes a state between point H on the contour line of 2 MPa and point I on the contour line of 1 MPa. Points H and I are located between the saturated liquid line and the dry saturated vapor line. That is, in a case where the high-boiling point refrigerant is isobutane, the outside air temperature is 0° C., and the pressure value of the refrigerant is 1 to 2 MPa, the refrigerant when the refrigerant flows into inner pipe 36*a* of second heat exchanger 36 is in a state in which at least a part of the high-boiling point refrigerant is liquefied.

Further, in the refrigerant in the embodiment described above, the medium-boiling point refrigerant may be ethylene. That is, the high-boiling point refrigerant may be defined as normal butane, the medium-boiling point refrigerant may be defined as ethylene, and the low-boiling point refrigerant may be defined as methane. In this case, the content of the high-boiling point refrigerant may be defined as 50% by weight, the content of the medium-boiling point refrigerant may be defined as 30% by weight, and the content of the low-boiling point refrigerant may be defined as 20% by weight.

Figure 9:
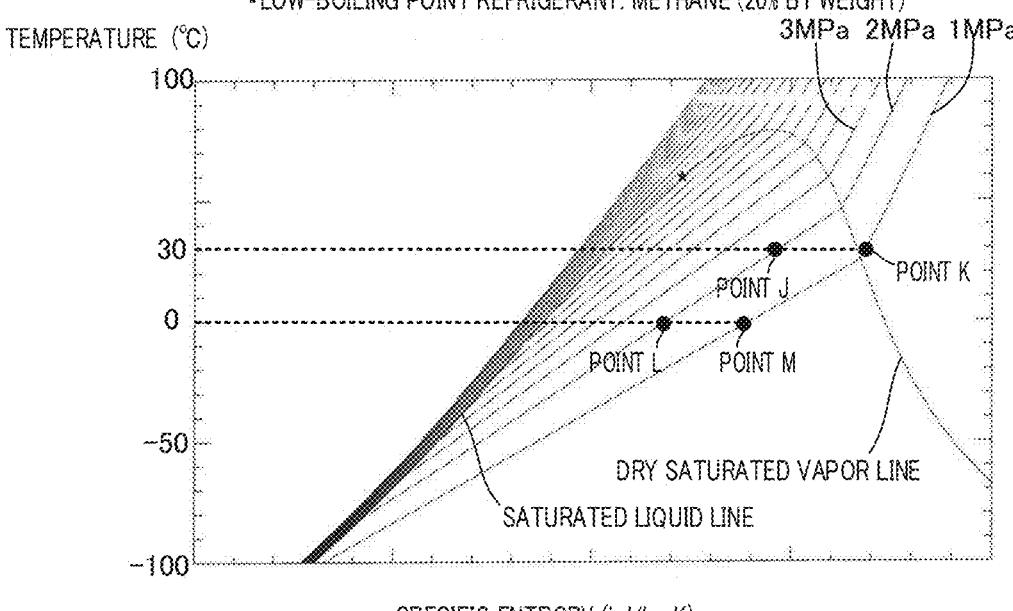
FIG. 9 is T-s diagram for the refrigerant according to a variation of the present disclosure.

FIG. 9 is T-s diagram for the refrigerant in a case where the medium-boiling point refrigerant is ethylene. In a case where the outside air temperature is 30° C. and the pressure value of the refrigerant is 2 MPa, the temperature of the refrigerant when the refrigerant flows into inner pipe 36*a* of second heat exchanger 36 is approximately the outside air temperature (30° C.), and the refrigerant at this time becomes the state at point J on the contour line of 2 MPa. Point J is located between the saturated liquid line and the dry saturated vapor line. That is, in a case where the medium-boiling point refrigerant is ethylene, the outside air temperature is 30° C., and the pressure value of the refrigerant is 2 MPa, the refrigerant when the refrigerant flows into inner pipe 36*a* of second heat exchanger 36 is in a state in which at least a part of the high-boiling point refrigerant is liquefied.

Note that, in a case where the outside air temperature is 30° C. and the pressure value of the refrigerant is 1 MPa, the temperature of the refrigerant when the refrigerant flows into inner pipe 36*a* of second heat exchanger 36 is approximately the outside air temperature (30° C.), and the refrigerant at this time becomes the state at point K on the contour line of 1 MPa. Point K is located rightward from the dry saturated vapor line. Accordingly, the refrigerant when the refrigerant flows into inner pipe 36*a* of second heat exchanger 36 is in a gas state and is not liquefied. That is, in a case where the medium-boiling point refrigerant is ethylene, it is desirable that the pressure value of the refrigerant be brought close to 2 MPa, and thus, the refrigerant when the refrigerant flows into inner pipe 36*a* of second heat exchanger 36 be liquefied. Note that, in a case where the outside air temperature is 0° C. and the pressure value of the refrigerant is 1 to 2 MPa, the temperature of the refrigerant when the refrigerant flows into inner pipe 36*a* of second heat exchanger 36 is approximately the outside air temperature (0° C.), and the refrigerant at this time becomes a state between point L on the contour line of 2 MPa and point M on the contour line of 1 MPa. Points L and M are located between the saturated liquid line and the dry saturated vapor line. That is, in a case where the medium-boiling point refrigerant is ethylene, the outside air temperature is 0° C., and the pressure value of the refrigerant is 1 to 2 MPa, the refrigerant when the refrigerant flows into inner pipe 36*a* of second heat exchanger 36 is in a state in which at least a part of the high-boiling point refrigerant is liquefied.

Further, in the refrigerant in the embodiment described above, the medium-boiling point refrigerant may be xenon. That is, the high-boiling point refrigerant may be defined as normal butane, the medium-boiling point refrigerant may be defined as xenon, and the low-boiling point refrigerant may be defined as methane. In this case, the content of the high-boiling point refrigerant may be defined as 50% by weight, the content of the medium-boiling point refrigerant may be defined as 30% by weight, and the content of the low-boiling point refrigerant may be defined as 20% by weight.

12

Figure 10:
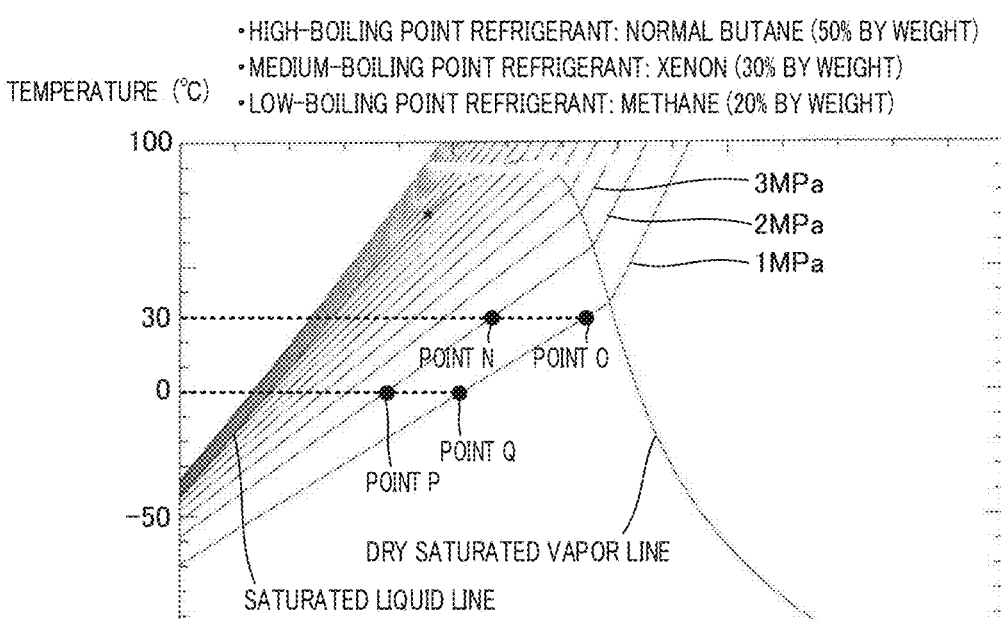
FIG. 10 is T-s diagram for the refrigerant according to a variation of the present disclosure.

FIG. 10 is T-s diagram for the refrigerant in a case where the medium-boiling point refrigerant is xenon. In a case where the outside air temperature is 30° C. and the pressure value of the refrigerant is 1 to 2 MPa, the temperature of the refrigerant when the refrigerant flows into inner pipe 36*a* of second heat exchanger 36 is approximately the outside air temperature (30° C.), and the refrigerant at this time becomes a state between point N on the contour line of 2 MPa and point O on the contour line of 1 MPa. Points N and O are located between the saturated liquid line and the dry saturated vapor line. Further, in a case where the outside air temperature is 0° C. and the pressure value of the refrigerant is 1 to 2 MPa, the temperature of the refrigerant when the refrigerant flows into inner pipe 36*a* of second heat exchanger 36 is approximately the outside air temperature (0° C.), and the refrigerant at this time becomes a state between point P on the contour line of 2 MPa and point Q on the contour line of 1 MPa. Points P and Q are located between the saturated liquid line and the dry saturated vapor line. That is, in a case where the medium-boiling point refrigerant is xenon, the outside air temperature is 0 to 30° C., and the pressure value of the refrigerant is 1 to 2 MPa, the refrigerant when the refrigerant flows into inner pipe 36*a* of second heat exchanger 36 is in a state in which at least a part of the high-boiling point refrigerant is liquefied.

Further, in the refrigerant in the embodiment described above, the low-boiling point refrigerant may be krypton. That is, the high-boiling point refrigerant may be defined as normal butane, the medium-boiling point refrigerant may be defined as ethane, and the low-boiling point refrigerant may be defined as krypton. In this case, the content of the high-boiling point refrigerant may be defined as 50% by weight, the content of the medium-boiling point refrigerant may be defined as 30% by weight, and the content of the low-boiling point refrigerant may be defined as 20% by weight.

Figure 11:
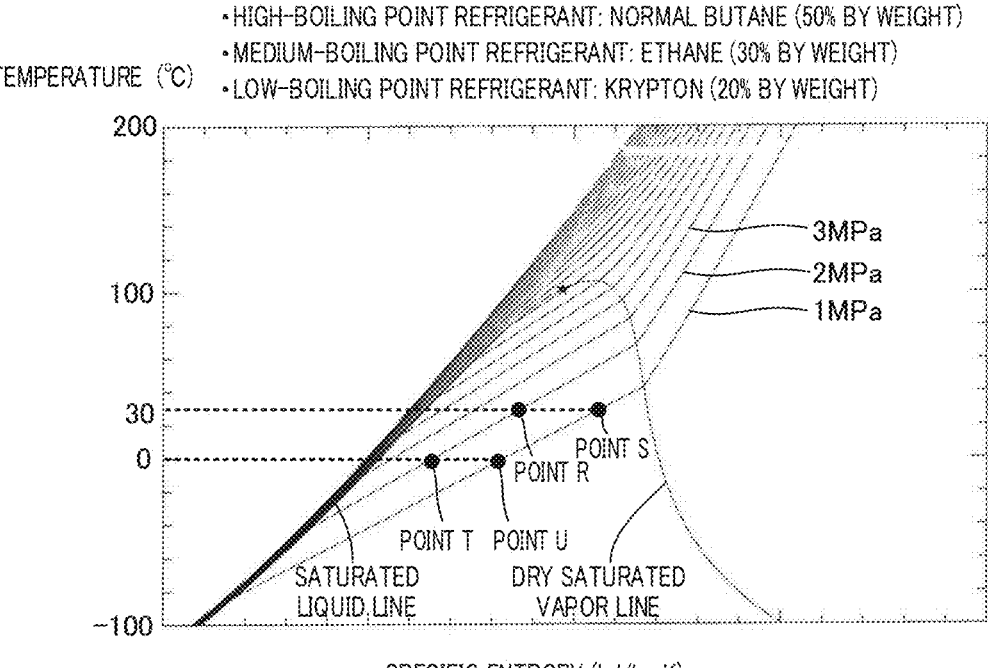
FIG. 11 is T-s diagram for the refrigerant according to a variation of the present disclosure.

FIG. 11 is T-s diagram for the refrigerant in a case where the low-boiling point refrigerant is krypton. In a case where the outside air temperature is 30° C. and the pressure value of the refrigerant is 1 to 2 MPa, the temperature of the refrigerant when the refrigerant flows into inner pipe 36*a* of second heat exchanger 36 is approximately the outside air temperature (30° C.), and the refrigerant at this time becomes a state between point R on the contour line of 2 MPa and point S on the contour line of 1 MPa. Points R and S are located between the saturated liquid line and the dry saturated vapor line. Further, in a case where the outside air temperature is 0° C. and the pressure value of the refrigerant is 1 to 2 MPa, the temperature of the refrigerant when the refrigerant flows into inner pipe 36*a* of second heat exchanger 36 is approximately the outside air temperature (0° C.), and the refrigerant at this time becomes a state between point T on the contour line of 2 MPa and point U on the contour line of 1 MPa. Points T and U are located between the saturated liquid line and the dry saturated vapor line. That is, in a case where the low-boiling point refrigerant is krypton, the outside air temperature is 0 to 30° C., and the pressure value of the refrigerant is 1 to 2 MPa, the refrigerant when the refrigerant flows into inner pipe 36*a* of second heat exchanger 36 is in a state in which at least a part of the high-boiling point refrigerant is liquefied.

Further, in the refrigerant in the embodiment described above, the medium-boiling point refrigerant may be xenon and the low-boiling point refrigerant may be krypton. That is, the high-boiling point refrigerant may be defined as normal butane, the medium-boiling point refrigerant may be defined as xenon, and the low-boiling point refrigerant as krypton. In this case, the content of the high-boiling point refrigerant may be defined as 50% by weight, the content of the medium-boiling point refrigerant may be defined as 30% by weight, and the content of the low-boiling point refrigerant may be defined as 20% by weight.

Figure 12:
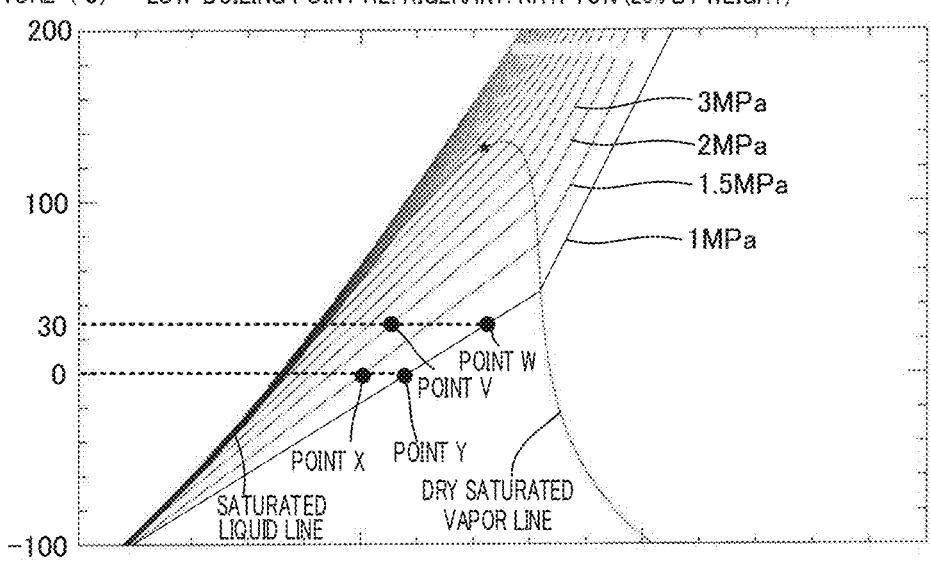
FIG. 12 is T-s diagram for the refrigerant according to a variation of the present disclosure.

FIG. 12 is T-s diagram for the refrigerant in a case where the medium-boiling point refrigerant is xenon and the low-boiling point refrigerant is krypton. In a case where the outside air temperature is 30° C. and the pressure value of the refrigerant is 1 to 2 MPa, the temperature of the refrigerant when the refrigerant flows into inner pipe 36a of second heat exchanger 36 is approximately the outside air temperature (30° C.), and the refrigerant at this time becomes a state between point V on the contour line of 2 MPa and point W on the contour line of 1 MPa. Points V and W are located between the saturated liquid line and the dry saturated vapor line. Further, in a case where the outside air temperature is 0° C. and the pressure value of the refrigerant is 1 to 2 MPa, the temperature of the refrigerant when the refrigerant flows into inner pipe 36a of second heat exchanger 36 is approximately the outside air temperature (0° C.), and the refrigerant at this time becomes a state between point X on the contour line of 2 MPa and point Y on the contour line of 1 MPa. Points X and Y are located between the saturated liquid line and the dry saturated vapor line. That is, in a case where the medium-boiling point refrigerant is xenon, the low-boiling point refrigerant is krypton, the outside air temperature is 0 to 30° C., and the pressure value of the refrigerant is 1 to 2 MPa, the refrigerant when the refrigerant flows into inner pipe 36a of second heat exchanger 36 is in a state in which at least a part of the high-boiling point refrigerant is liquefied.

Further, refrigeration circuit 30 may not include second heat exchanger 36. In this case, heat exchanger 35 is configured such that almost all of the refrigerant flowing from compressor 31 to evaporator 34 liquefies.

Figure 13:
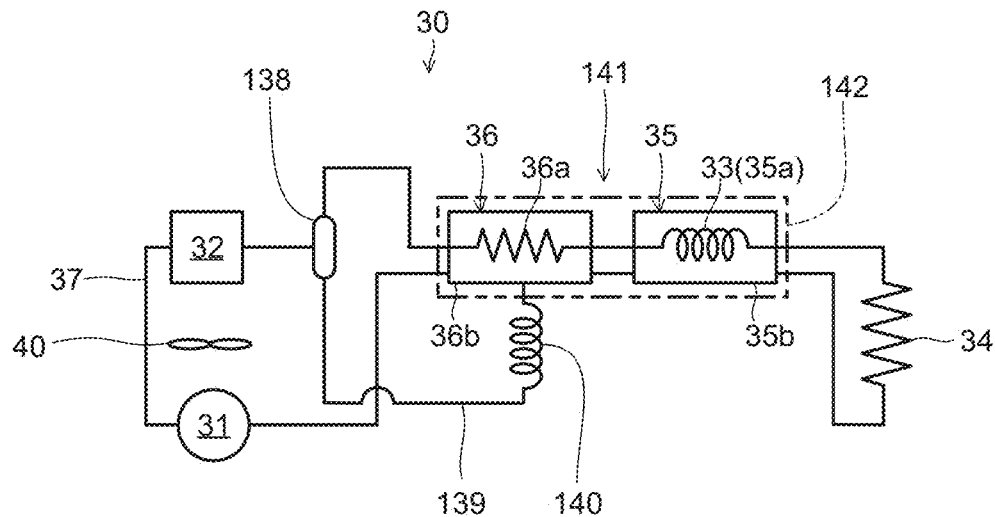
FIG. 13 is a schematic diagram of the refrigeration circuit in a variation of the present disclosure.

FIG. 13 is a schematic diagram of refrigeration circuit 30 according to a variation. Refrigeration circuit 30 according to the variation may further include: gas-liquid separator 138; second piping 139 that connects gas-liquid separator 138 to outer pipe 36b of second heat exchanger 36; and second expander 140 (for example, a capillary tube) disposed in second piping 139.

Gas-liquid separator 138 is disposed between condenser 32 and second heat exchanger 36, and separates the refrigerant flowing from condenser 32 to second heat exchanger 36 into a gas-phase refrigerant and a liquid-phase refrigerant.

In the refrigerant flowing from condenser 32 to second heat exchanger 36, a part of the high-boiling point refrigerant is liquefied in condenser 32. That is, the liquid-phase refrigerant is the high-boiling point refrigerant in a liquid state. The liquid-phase refrigerant flowing out from gas-liquid separator 138 flows through second piping 139, is depressurized by second expander 140, and flows into outer pipe 36b of second heat exchanger 36. In outer pipe 36b of second heat exchanger 36, the liquid-phase refrigerant merges with the return refrigerant to cool the refrigerant flowing through inner pipe 36a of second heat exchanger 36. Thus, it is possible to achieve further reduction in the temperature of the refrigerant flowing from compressor 31 to evaporator 34, and further to achieve reduction in the temperature of the refrigerant flowing through evaporator 34.

The liquid-phase refrigerant vaporizes by absorbing heat from the refrigerant flowing through inner pipe 36a of second heat exchanger 36, flows out from outer pipe 36b of second heat exchanger 36, and flows into compressor 31.

The gas-phase refrigerant is, on the other hand, the high-boiling point refrigerant, the medium-boiling point refrigerant, and the low-boiling point refrigerant, each of which is in a gas state. The gas-phase refrigerant flowing out from gas-liquid separator 138 flows through piping 37 and flows into inner pipe 36a of second heat exchanger 36.

Further, as indicated with the two-dot chain line in FIG. 13, refrigeration circuit 30 according to the variation may further include insulating material 142 that covers heat exchanger 35 and second heat exchanger 36, and forms heat exchanger module 141 that is a single heat exchanger module. Insulating material 142 is, for example, a urethane-resin foam. Insulating material 142 is capable of suppressing release of the heat of heat exchanger 35 and second heat exchanger 36 into the outside air, and thus, a heat exchange in heat exchanger 35 and second heat exchanger 36 is efficiently performed. Accordingly, the refrigerant flowing through heat exchanger 35 and inner pipe 36a of second heat exchanger 36 can be efficiently liquefied. Further, piping 37 around heat exchanger 35 and second heat exchanger 36, which includes piping 37 between heat exchanger 35 and second heat exchanger 36, can be covered with insulating material 142. It is possible to further suppress release of the heat of heat exchanger 35 and second heat exchanger 36 into the outside air. Thus, it is possible to achieve further stabilization of the refrigeration capacity of refrigeration apparatus 1.

Further, cross flow configurator 37b may be configured such that the direction of the refrigerant flowing through cross flow configurator 37b intersects with, without being orthogonal to, the direction of the cooling air. For example, first portion 37b1 may be formed such that the refrigerant flows toward the front from the rear or toward the rear from the front as first portion 37b1 is toward the right from the left. Further, second portion 37b2 may be formed such that the refrigerant flows toward the front from the rear or toward the rear from the front as second portion 37b2 is toward the up from the down. In addition, third portion 37b3 may be formed such that the refrigerant flows toward the front from the rear or toward the rear from the front as third portion 37b3 is toward the left from the right.

Further, piping 37 may include countercurrent flow configurator 37a between first portion 37b1 and second portion 37b2 in cross flow configurator 37b and between second portion 37b2 and third portion 37b3 in cross flow configurator 37b.

Further, heat exchanger 35 may be configured to include, instead of outer pipe 35b, piping through which the return refrigerant flows, and the piping through which the return refrigerant flows may be configured to be wound around the outer peripheral surface of expander 33.

The disclosure of Japanese Patent Application No. 2021-212650, filed on Dec. 27, 2021, including the specification, claims, drawings and abstract, is incorporated herein by reference in its entirety.

INDUSTRIAL APPLICABILITY

The refrigeration apparatus in the present disclosure is widely utilizable for an ultra-low temperature storage container, an ultra-low temperature freezer, a pharmaceutical refrigerator, a blood bank refrigerator, or a thermostat. Further, the refrigeration apparatus in the present disclosure is also widely utilizable for a refrigeration apparatus including a plurality of refrigeration circuits independently.

REFERENCE SIGNS LIST

1 Refrigeration apparatus
30 Refrigeration circuit
31 Compressor
31a Deriver
32 Condenser
33 Expander
34 Evaporator
35 Heat exchanger
36 Second heat exchanger
37 Piping
37a Countercurrent flow configurator
37b Cross flow configurator
40 Fan
138 Gas-liquid separator
139 Second piping
140 Second expander
141 Heat exchanger module
142 Insulating material
The invention claimed is:

1. A refrigeration apparatus, comprising:
a refrigerant;
a refrigeration circuit for circulating the refrigerant, the refrigeration circuit including:
  a compressor;
  a condenser;
  an expander formed of a capillary tube;
  an evaporator; and
  a heat exchanger that cools the refrigerant flowing through the expander by means of the refrigerant flowing from the evaporator to the compressor;
a fan which generates cooling air that cools the condenser; and
a machine processor,
wherein
the refrigerant is a non-azeotropic refrigerant mixture that contains:
  50% by weight or more and 80% by weight or less of a high-boiling point refrigerant,
  10% by weight or more and less than 50% by weight of a medium-boiling point refrigerant, and
  20% by weight or less of a low-boiling point refrigerant,
the medium-boiling point refrigerant having a boiling point lower than a boiling point of the high-boiling point refrigerant,
the low-boiling point refrigerant having a boiling point lower than the boiling point of the medium-boiling point refrigerant,
a content of the high-boiling point refrigerant in the refrigerant is larger than a content of the medium-boiling point refrigerant in the refrigerant,
the content of the medium-boiling point refrigerant in the refrigerant is larger than a content of the low-boiling point refrigerant in the refrigerant,
piping through which the refrigerant discharged from the compressor and flowing into the condenser passes includes a first pipe,
the machine processor houses the compressor, the condenser, the fan, and the piping, the machine processor includes a front opening and a rear opening, the fan is disposed between the front opening and the rear opening, the refrigeration apparatus is configured that when the fan rotates, outside air is sucked into the machine processor through the front opening, and air in the machine processor is discharged from the rear opening, and the first pipe is arranged such that the refrigerant flowing through the first pipe enters the condenser in a direction opposite to a direction of the cooling air flows.

2. The refrigeration apparatus according to claim 1, wherein:
the high-boiling point refrigerant is normal butane or isobutane,
the medium-boiling point refrigerant is ethane, ethylene, or xenon, and
the low-boiling point refrigerant is methane or krypton.

3. The refrigeration apparatus according to claim 2, wherein:
the high-boiling point refrigerant is normal butane,
the medium-boiling point refrigerant is ethane, and
the low-boiling point refrigerant is methane.

4. The refrigeration apparatus according to claim 1, wherein:
the condenser, the fan, and the compressor are arranged in this order along a direction in which the cooling air flows.

5. The refrigeration apparatus according to claim 1, wherein
the piping includes a second pipe arranged between the fan and the compressor in which the refrigerant flows in a direction orthogonal to the direction of the cooling air flows.

6. The refrigeration apparatus according to claim 5, wherein the refrigeration apparatus is configured such that the refrigerant flowing out of compressor flows through the second pipe, the first pipe, and then flows into the condenser.

7. The refrigeration apparatus according to claim 5, wherein the second pipe includes a first portion, a second portion, and a third portion, and the refrigerant flows in the second portion in a direction perpendicular to a direction the refrigerant flows in the first portion and a direction the refrigerant flows in the third portion, respectively.

8. The refrigeration apparatus according to claim 7, wherein the direction the refrigerant flows in the first portion is opposite to the direction the refrigerant flows in the third portion.

9. The refrigeration apparatus according to claim 1, wherein
the refrigeration apparatus is configured such that, when the refrigerant flows from the evaporator toward the compressor, a temperature of the refrigerant entering the heat exchanger is equal to or lower than a critical temperature of the low-boiling point refrigerant.

10. The refrigeration apparatus according to claim 1, wherein
the refrigeration apparatus is configured such that, when the refrigerant flows from the compressor to the evaporator, a pressure value of the refrigerant is equal to or lower than 2 MPa.

11. The refrigeration apparatus according to claim 1, wherein
the refrigeration circuit further includes:
  a second heat exchanger between the condenser and the heat exchanger, the second heat exchanger being a second heat exchanger in which the refrigerant flowing from the condenser to the heat exchanger and the refrigerant flowing from the heat exchanger to the compressor exchange heat; and an insulating material that covers the heat exchanger and the second heat exchanger and forms a heat exchanger module, the heat exchanger module being a single heat exchanger module.

12. The refrigeration apparatus according to claim 11, wherein:

the refrigeration circuit further includes:

a gas-liquid separator between the condenser and the second heat exchanger, the gas-liquid separator separating the refrigerant into a gas-phase refrigerant and a liquid-phase refrigerant, the refrigerant flowing from the condenser to the second heat exchanger; and second piping that connects the second heat exchanger to the gas-liquid separator such that the refrigerant merges with the liquid-phase refrigerant in the second heat exchanger, the refrigerant flowing from the heat exchanger to the compressor.

\* \* \* \* \*